Patented Aug. 29, 1950

2,520,720

UNITED STATES PATENT OFFICE 2,520,720

BITUMINOUS COMPOSITIONS

Denham Harman, Berkeley, and Harry J. Sommer, Corona Del Mar, Calif., assignors to Shell Development Company, San Francisco, Calif., a corporation of Delaware No Drawing. Application September 30, 1947, Serial No. 777,110

13 Claims. (Cl. 106—273)

This invention is concerned with the preparation of bituminous compositions and is more particularly concerned with asphalt compositions and articles made therefrom having improved properties such as adhesion and compressibility.

It is well known that bituminous substances have relatively good covering and adhesive power for dry solids such as rocks, stones, sand, cement, etc. However, it often becomes difficult to obtain a satisfactory bond between a moist aggregate and a bituminous material such as asphalt. Furthermore, when a solid has been coated with a bituminous substance and is subsequently exposed to water or weathering it often happens that water displaces the asphalt from the solid and may strip it completely.

A number of materials have been incorporated in bituminous compositions to improve their resistance to disintegration by moisture or weathering. For the most part, the additives which have been used have been only partially successful and their effect has been found to be more or less temporary. For example, acidic additives such as oleophylic fatty acids improve the adhesion of certain asphalts to basic aggregates such as limestone. Various amines and amides have been used for similar purposes but their effect is largely confined to compositions where acidic aggregates such as granite predominate. It has been noted that the effect of any of these additives is quite specific in relation to the particular asphalt being employed. However, the greatest shortcoming which additives exhibit is their tendency to lose their adhesion effect especially when the asphalt or asphalt composition containing them is subjected to periods of heating. This is an extremely serious shortcoming since most asphalts are shipped from the refinery to a construction site in heated tank cars, or are heated at least immediately prior to their use in construction projects such as roads and like structures. Due to the specific nature of these various additives it is usually necessary for a manufacturer, refiner or contractor to maintain a stock of various additives and to vary his compositions according to the immediate problem at hand. Usually this involves a considerable amount of testing to ascertain whether or not a specific additive or combination thereof is effective in a particular asphalt or with a specific aggregate.

It is an object of this invention to improve the adhesion of bituminous materials to solids. It is another object of this invention to provide a relatively universal adhesion agent for bituminous substances. More particularly, it is an object of this invention to provide an improved adhesion agent which is highly resistant to thermal influences and to abnormal weather and mechanical stress conditions. Other objects will become evident in the following discussion.

Now, in accordance with this invention it has been found that water-insoluble polyamines obtained by hydrogenating the condensation product of an alpha-beta unsaturated aldehyde and ammonia or an amine has an outstanding effect upon bituminous substances, particularly in relation to improving their adhesion characteristics toward solids and in improving their compression characteristics. As more fully described hereinafter, these water-insoluble polyamines may be in the free state, in the form of organic acid salts or in at least partial amide formation with organic acids. The significant improvement which these agents exhibit is one of a lasting character resistant to adverse thermal conditions and to oxidation. The consequent endurance of the beneficial effects is the quality which distinguishes these particular additives from other agents known to the prior art.

The unsaturated aldehydes from which these polyamines may be prepared include those which contain an aliphatic carbon-to-carbon multiple bond interconnecting two carbon atoms, one of which is directly attached to the carbon atom of the formyl group. A particularly preferred group of unsaturated aldehydes which may be used in the preparation of these polyamines comprises acrolein and its homologs. The preferred group comprising these aldehydes may be defined by the structural formula

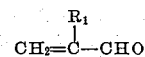

in which $R_1$ represents either a hydrogen atom or an alkyl group and which may be named alpha-methylene alkanols or alpha-methylene aliphatic aldehydes. This class of aldehydes among others includes acrolein, methacrolein, alpha-ethylacrolein, alpha-propylacrolein, alpha-isopropylacrolein, the alpha-butylacroleins, and their homologs which correspond to the above formula.

Aldehydes of this particular type are condensed with ammonia or amines, especially primary amines. Preferably conditions are employed wherein all of the reactants are in a liquid state, but vapor phase condensations may be used as well. The primary amines forming the most satisfactory products for use in the present invention include especially the aliphatic primary amines in which the alkyl group attached to the amino radical has from one to about 24 carbon atoms. The preferred reaction temperature is from about −70° to about +150° C., especially when liquid phase reactions are employed. Liquid ammonia is a particularly favored reactant. The products obtained from this reaction are polymeric in character and ordinarily are ineffective as additives for asphalt compositions. However, upon removal of excess amines or ammonia and hydrogenation of the condensation products, polyamines are formed. The usual hydrogenation catalysts may be used and hydrogenation may take place concurrently with or subsequent to the condensation.

These polyamines are usually viscous oils which may range in color from a light yellow to a dark brown, and contain carbon, nitrogen, and hydrogen as well as up to about 10% of oxygen. The average molecular weight of the polyamines generally is from about 2½ to about 6 times the molecular weight of the unsaturated aldehyde reactant, e. g. the polyamines prepared from acrolein and liquid ammonia have average molecular weights generally within the range from about 135 to about 330. The ratio of the molecular weight to the equivalent weight generally is within the range of from about 2.5 to about 4. They contain on the average more than 2 atoms of nitrogen per molecule, as judged by comparison of the average molecular weight and the average equivalent weight. These polyamines are thought to be composed predominantly of complex mixtures of higher polyalkylene polyamines comprising a plurality of secondary amine nitrogen atoms and a plurality of alkyl groups and to be formed by the continued condensation of the unsaturated aldehyde with nitrogenous compounds that are formed under the conditions described.

Many of these polyamines are water-soluble or dispersible and in this form are usually unsuitable for use in the present compositions. In order to produce a water-insoluble additive therefrom these polyamine hydrogenated products may be treated with an organic acid so as to form salts or amides. Dependent upon the solubility characteristics of the reactants and of the products so formed, the degree of reaction of the amino groups may vary within a considerable range. For instance, as shown in Example I below, the polyamine obtained by the hydrogenation of the condensation product of acrolein and liquid ammonia may be water-insoluble by reaction of as little as ⅓ of its amino groups with a higher fatty acid such as oleic acid. It will be appreciated that the reaction products so obtained are very probably complex mixtures of salts and amides with the criterion that the substantial proportion thereof is water-insoluble. These products are easily prepared by heating the polyamine hydrogenated product with an organic acid at temperatures between about 100 and 300° C. for periods varying from about 5 minutes to 3 hours. The products so obtained differ little in appearance from the polyamine hydrogenated products but exhibit the outstanding adhesion and compression characteristics referred to above when incorporated in bituminous compositions.

Other means may be used for insolubilizing or producing a water-insoluble polyamine hydrogenated product. Thus, by condensing an unsaturated aldehyde with an amine having an aliphatic radical of greater than about 6 carbon atoms a product may be obtained which is usually water-insoluble without further treatment with an organic acid.

Typical acids which may be used for insolubilization include the higher fatty acids having more than about 6 carbon atoms and especially those having greater than about 10 carbon atoms, including oleic, linoleic, and stearic acids among others. Additional types of acids which have been found suitable for this purpose include saturated cyclic acids such as the naphthenic acids derived from petroleum fractions, and crude natural products such as tall oil.

In the specification and claims the term "bituminous substances" is meant to include these materials containing asphaltenes or tarry constituents such as the following:

Bitumens

| Natural waxes: | Asphalites |
|---|---|
| Ozokerite | Gilsonite |
| Ceresine | Glance pitch |
| Montan wax | Grahamite |
| Natural asphalts: | |
| Malta asphalt | |
| Trinidad asphalt | |

Pyrogenous distillates

| Pyrogenous waxes: | Wood tars: |
|---|---|
| Paraffin wax | Pine tar |
| Petroleum tars: | Hardwood tar |
| Oil-gas tar | Miscellaneous tars: |
| Coal tars: | Peat tar |
| Gas-retort coal tar | Lignite tar |
| Low-temperature coal tar | Shale tar |
| | Bone tar |

Pyrogenous residues

| Pyrogenous asphalts: | Petroleum pitch: |
|---|---|
| Residual oils | Oil-gas tar pitch |
| Blown petroleum asphalt | Coal-tar pitch: |
| Soft residual asphalt | Gasworks coal-tar pitch |
| Hard residual asphalt | |
| Sludge asphalt | |

The solids toward which the subject combination of modifiers is responsive include both the acidic aggregates such as granite, quartz, and feldspar as well as the basic aggregates of the limestone type, in addition to other surfaces such as metals, glass, cement, etc. The subject additives have been found to be particularly effective when used in conjunction with the so-called acidic aggregates such as silicious materials and granite. However, they show a satisfactory response with the basic types as well.

The amount of the additive necessary to impart the desired degree of improvement in adhesion and compression characteristics varies considerably with the specific materials to be used. For instance, amounts as little as 0.25% by weight of the additive based upon the bituminous substances may be sufficient in special cases. When using acidic aggregates 0.5% is ordinarily satisfactory and in cases where extreme conditions of use may be expected as much as about 5% may be employed. The preferred quantities are those between 1% and 3% by weight of the additive in the bituminous substance.

In accordance with the present invention, it has been discovered that these additives not only improve the adhesion of bituminous substances for solid surfaces but that they provide a substantially permanent improvement in this regard in spite of any thermal influences which may be encountered. Another unexpected improvement which is related to these additions is the substantial increase in compressive strength of bituminous compositions containing them and, furthermore, the maintenance of this characteristic in spite of adverse thermal or humidity influences. Another outstanding characteristic is the relatively universal effect which this combination has in regard to both asphalts and aggregates. It has been found that the agents are highly effective over a very wide range of pH values beyond that normally encountered in building materials and that they are effective in substantially all types of asphalts regardless of their source. The following examples have been included to illustrate the properties of the compositions of the present invention:

*Example I—Preparation of the adhesion agents*

22 parts of acrolein were mixed with 90 parts of anhydrous liquid ammonia at a temperature of −60° to −70° C. A clear mobile liquid was formed. The excess ammonia was removed from the mixture by allowing the mixture to warm to room temperature in an open vessel. The residue, amounting to 28 parts, was dispersed in 105 parts of absolute ethanol. 5 parts of Raney nickel catalyst were added to the dispersion and the mixture was subjected for one hour to the action of hydrogen gas under a pressure of 1000 pounds per square inch at 100° C. Low boiling material, chiefly ethanol, was removed by distillation under reduced pressure, leaving 18 parts of a viscous, water-soluble oil having the following characteristics:

| | |
|---|---|
| Molecular weight | 228.00 |
| Equivalent weight | 70.00 |
| Percent carbon | 61.38 |
| Percent nitrogen | 19.25 |
| Percent hydrogen | 10.80 |
| Percent oxygen | 8.57 |

The polyamine hydrogenated product thus obtained is water-soluble. In order to insolubilize it, oleic acid is heated therewith at 240° C. for 15 minutes to form mixed reaction products principally consisting of oleic acid salts and amides of the polyamine. Three such products were prepared:

| Additive | Equivalent Ratio, polyamine:oleic acid |
|---|---|
| 1A | 3:1 |
| 1B | 2:1 |
| 1C | 1:1 |

These additives were employed in the tests described below:

*Example II*

The effect of the additives was examined by the "Total Water Immersion Test" as follows, using a granitic aggregate.

500 gms. of an aggregate passing 1.5 inch screen but retained by .75 inch screen is immersed in water for 30 minutes, drained and mixed for five minutes with 35 gms. of asphalt cutback in a large porcelain dish by means of a large aluminum spoon.

The coated rock is placed in a wide mouth, screw top, pint jar and the lid tightened. After allowing it to stand for 30 minutes, the contents of the jar are covered with distilled water, the lid replaced and the jar placed in a thermostat bath at 105° F. for 3 hours.

At the end of this time the stones, while under water, are individually inspected, and the surface which has remained covered is estimated visually and averaged for all stones. The result is expressed in tenths of the surface, rounded to the nearest integer and is reported as the T. W. I. T. value. Accordingly, if the stones remain on the average 95% or more covered with the asphalt at the end of the test, the T. W. I. T. value is 10; if they remain 45–55% covered, the value is 5. The results obtained are listed in the table below, together with crude sources of the several asphalts used and the concentration of the additives dissolved therein:

| Source of Asphalt | Additive | Additive concentration, per cent by weight | T. W. I. T. value |
|---|---|---|---|
| San Joaquin Valley Crude | None | | 2 |
| Do | 1A | 0.5 | 9 |
| Do | 1A | 1.0 | 10 |
| Do | 1B | 1.0 | 9 |
| Do | 1C | 1.0 | 10 |
| Gulf Coast Crude | None | | 2 |
| Do | 1A | 0.5 | 10 |
| Do | 1A | 1.0 | 10 |
| Do | 1B | 1.0 | 10 |
| Do | 1C | 1.0 | 10 |
| Venezuelan Crude | None | | 2 |
| Do | 1A | 0.5 | 10 |
| Do | 1A | 1.0 | 10 |
| Do | 1B | 1.0 | 10 |
| Do | 1C | 1.0 | 9 |
| Mid-Continent Crude | None | | 2 |
| Do | 1A | 0.5 | 7 |
| Do | 1A | 1.0 | 10 |

*Example III*

In order to test the stability of additives under conditions normally met in storage, shipment or application, some of the asphalts containing the 1A additive (3:1 polyamine:oleic acid equivalent ratio) were heated for 7 days at 121° C., after which the test described in Example II was repeated. The data obtained are given in the table below:

| Source of asphalt | Additive (concentration weight per cent) | T. W. I. T. value |
|---|---|---|
| San Joaquin Valley Crude | 0.0 | 1 |
| Do | 0.5 | 8 |
| Do | 1.0 | 10 |
| Gulf Coast Crude | 0.0 | 1 |
| Do | 0.5 | 10 |
| Do | 1.0 | 10 |
| Venezuelan Crude | 0.0 | 1 |
| Do | 0.5 | 9 |
| Do | 1.0 | 10 |
| Mid-Continent Crude | 0.0 | 0 |
| Do | 1.0 | 7 |

*Example IV*

Another standard test was applied to asphalts containing some of the additives, as follows:

The retention of a continuous film of asphalt on a solid surface was tested by the following procedure:

Six parts of the asphalts listed below were mixed with 100 parts of a soda rhyolite aggregate graded between ½" (100% passing) and ¼" (100% retained) sieves, which had 2% by weight of water on its surfaces. In each case the coating of the aggregate was substantially complete immediately after the composition was spread out on a tin plate. After standing in open air at room temperature for one hour, the samples were covered with distilled water for 20 hours at room temperature, after which the percent of asphalt coating retained on the aggregate was estimated. The following data were obtained:

| Source of asphalt | Additive | Additive concentration, weight per cent | Per cent coating retained on aggregate |
|---|---|---|---|
| San Joaquin Valley Crude | None | | 5 |
| Do | 1A | 0.5 | 98 |
| Do | 1A | 1.0 | 100 |
| Do | 1B | 1.0 | 95 |
| Do | 1C | 1.0 | 100 |
| Gulf Coast Crude | None | | 5 |
| Do | 1A | 0.5 | 100 |
| Do | 1A | 1.0 | 100 |
| Do | 1B | 1.0 | 100 |
| Do | 1C | 1.0 | 100 |
| Venezuelan Crude | None | | 5 |
| Do | 1A | 0.5 | 100 |
| Do | 1A | 1.0 | 100 |
| Do | 1B | 1.0 | 99 |
| Do | 1C | 1.0 | 100 |
| Mid-Continent Crude | None | | 5 |
| Do | 1A | 0.5 | 85 |
| Do | 1A | 1.0 | 100 |
| Do | 1B | 1.0 | 90 |
| Do | 1C | 1.0 | 80 |

*Example V*

In order to determine the retention of adhesion characteristics by the subject additives under conditions simulating hot storage or shipment, some of the samples containing additive 1A, reported in the previous example, were repeated, with exception that the asphalts containing additives were heated for 168 hours at 121° C. before being used to coat the aggregate. The data obtained are given in the following table:

| Source of asphalt | Additive concentration, weight per cent | Percent coating retained on aggregate |
|---|---|---|
| San Joaquin Valley Crude | 0.0 | 5 |
| Do | 0.5 | 90 |
| Do | 1.0 | 100 |
| Gulf Coast Crude | 0.0 | 5 |
| Do | 0.5 | 100 |
| Do | 1.0 | 100 |
| Venezuelan Crude | 0.0 | 5 |
| Do | 0.5 | 98 |
| Do | 1.0 | 100 |
| Mid-Continent Crude | 0.0 | 5 |
| Do | 1.0 | 85 |

*Example VI*

The following test demonstrates the improvement in compressive strength effected by addition of the additive 1A (3:1 equivalent ratio of polyamine and oleic acid) prepared as described in Example I. In each case 1% by weight of the additive was incorporated in asphalt.

| Source of asphalt | No additive, percent comp. strength retained | 1% additive, percent comp. strength retained |
|---|---|---|
| San Joaquin Valley Crude | 32 | 59 |
| Gulf Coast Crude | 18 | 56 |
| Venezuelan Crude | 29 | 52 |
| Mid-Continent Crude | 28 | 50 |

*Example VII*

In order to determine the ability of the subject combination of additives to maintain their effectiveness over long periods of heating, such as would occur during shipment to a construction site, the following test was performed:

The samples described in Example VI were duplicated except that the asphalt, after the addition of additives, was held at a temperature of 250° F. for 168 hours before the test cylinders were made. The compression strength retention test, described in Example I, then was performed. The results are given in the following table:

| Source of asphalt | No additive, per cent comp. strength retained | 1% additive, per cent comp. strength retained |
|---|---|---|
| San Joaquin Valley Crude | 32 | 49 |
| Gulf Coast Crude | 18 | 82 |
| Venezuelan Crude | 29 | 45 |
| Mid-Continent Crude | 28 | 61 |

*Example VIII*

The polyamine hydrogenated product prepared as described in Example I was heated for 15 minutes at 240° C. with heavy naphthenic acids derived from lubricating oil stock in order to form a complex mixture of naphthenic acid salts and amides of the polyamine, a 3:1 equivalent ratio of polyamine to naphthenic acid being employed. Using this additive, the tests described in Examples IV and V were repeated with the following results:

| Source of asphalt | Per cent additive concentration | Per cent coating retained on aggregate | Asphalt + additive heated 168 hrs. at 121° C., per cent coating retained on aggregate |
|---|---|---|---|
| San Joaquin Valley Crude | 0.0 | 5 | 5 |
| Do | 1.0 | 90 | 95 |
| Gulf Coast Crude | 0.0 | 5 | 5 |
| Do | 1.0 | 100 | 98 |
| Venezuelan Crude | 0.0 | 5 | 5 |
| Do | 1.0 | 98 | 98 |
| Mid-Continent Crude | 0.0 | 5 | 5 |
| Do | 1.0 | 85 | 70 |

*Example IX*

The polyamine hydrogenated product prepared as described in Example I was heated for 15 minutes at 240° C. with tall oil to form a complex mixture of tall oil salts and amides of the polyamine, a 3:1 equivalent ratio of polyamine to tall oil being employed. This additive was tested as described in Examples IV and V with the following results:

| Source of asphalt | Per cent additive concentration | Per cent coating retained on aggregate | Asphalt +additive heated 168 hrs. at 120° C., coating retained on aggregate |
|---|---|---|---|
| San Joaquin Valley Crude | 0.0 | 5 | 5 |
| Do | 1.0 | 80 | 95 |
| Gulf Coast Crude | 0.0 | 5 | 5 |
| Do | 1.0 | 100 | 100 |
| Venezuelan Crude | 0.0 | 5 | 5 |
| Do | 1.0 | 98 | 98 |
| Mid-Continent Crude | 0.0 | 5 | 5 |
| Do | 1.0 | 98 | 90 |

The Retention of Strength Test employed in obtaining the data reported in Examples VI and VII is as follows:

In each case 1 part by weight of the additive 1A was incorporated in 100 parts by weight of the asphalt. The resulting composition was mixed at 77° F. with 1500 parts of crushed sodium rhyolite. The aggregate was of a size passing a 4 mesh sieve. The resulting mixture was compressed into cylinders 2 inches in diameter and 4 inches in length by application of a load of 1500 p. s. i. on both ends of the sample for 1 minute.

Duplicate samples were prepared; one was tested for compressive strength without further treatment and a second was immersed for 3 days in water and then tested for compressive strength. The compressive strengths of the first two comparative samples were compared and the results reported are the percentages of the original strength retained after the water soaking.

The compressive strength was tested by placing the cylinder on end and applying a downward load at a rate of one inch per minute until the cylinder disintegrates. The maximum pressure recorded by the testing machine was taken as the compressive strength. The data obtained are given, together with comparative data from samples containing no additives.

We claim as our invention:

1. A bituminous composition having improved adhesion and compression characteristics comprising a major amount of an asphalt and 0.5-5% by weight of a water-insoluble material obtained by reacting a substance selected from the group consisting of ammonia and an aliphatic primary amine having 1-24 carbon atoms with an alpha-methylene alkanal at a temperature between −70° C. and +150° C., hydrogenating the resulting reaction product and reacting the hydrogenated reaction product with an organic carboxylic acid having more than 6 carbon atoms to produce said water-insoluble material.

2. A bituminous composition having improved adhesion and compression characteristics comprising a major amount of an asphalt and 0.5-5% by weight of a product obtained by treating acrolein with ammonia at −60 to −70° C., removing excess ammonia, hydrogenating the reaction product, and heating the hydrogenated reaction product with 1-3 equivalent weights of a fatty acid having more than 6 carbon atoms at 100 to 300° C. for 5 to 180 minutes.

3. A composition according to claim 2 wherein the fatty acid is oleic acid.

4. A composition according to claim 2 wherein said hydrogenated reaction product and fatty acid are heated together for a period of 15 minutes at 240° C.

5. A bituminous composition having improved adhesion and compression characteristics comprising a major amount of an asphalt and 0.5-5% by weight of a product obtained by treating ammonia with an alpha-methylene alkanal at a temperature between −70° C. and +150° C., removing excess ammonia, hydrogenating the reaction product and heating the hydrogenated reaction product with 1-3 equivalent weights of a fatty acid having more than 6 carbon atoms at 100° C. to 300° C. for 5 to 180 minutes.

6. A bituminous composition having improved adhesion and compression characteristics comprising a major amount of an asphalt and 0.5-5% by weight of a product obtained by treating an aliphatic primary amine having 1-24 carbon atoms with an alpha-methylene alkanal at a temperature between −70° C. and +150° C., removing excess amine and hydrogenating the reaction product and reacting the hydrogenated reaction product with an organic carboxylic acid having more than 6 carbon atoms to produce a water-insoluble product.

7. A bituminous composition having improved adhesion and compression characteristics comprising a major amount of an asphalt and 0.5-5% by weight of a product obtained by treating ammonia with acrolein at a temperature between −70° C. and +150° C., removing excess ammonia, hydrogenating the reaction product and heating the hydrogenated reaction product with 1-3 equivalent weights of an organic carboxylic acid having more than 6 carbon atoms at a temperature of 100° C. to 300° C. for 5 to 180 minutes.

8. A bituminous composition according to claim 7, wherein the organic acid is a mixture of petroleum naphthenic acids.

9. A bituminous composition according to claim 7, wherein the organic acid is tall oil.

10. A composition according to claim 5 wherein the product obtained by treating ammonia with the alpha-methylene alkanal has a molecular weight from about 2.5 to about 6 times the molecular weight of said alkanal.

11. A composition according to claim 7 wherein the product obtained by treating ammonia with acrolein has a molecular weight between about 135 and about 330.

12. A composition according to claim 1 wherein the organic carboxylic acid has more than 10 carbon atoms.

13. A composition according to claim 1 wherein the water-insoluble material is present in an amount of 1-3% by weight.

DENHAM HARMAN.
HARRY J. SOMMER.

REFERENCES CITED

The following references are of record in the file of this patent:

UNITED STATES PATENTS

| Number | Name | Date |
|---|---|---|
| 1,674,523 | Sadtler | June 19, 1928 |
| 2,191,295 | Dohse et al. | Feb. 20, 1940 |
| 2,386,867 | Johnson | Oct. 16, 1945 |
| 2,426,220 | Johnson | Aug. 26, 1947 |

FOREIGN PATENTS

| Number | Country | Date |
|---|---|---|
| 568,385 | Great Britain | Apr. 3, 1945 |
| 847,829 | Great Britain | July 10, 1939 |